Oct. 8, 1963   L. MAIER ET AL   3,106,341
CARRIAGE CONTROL APPARATUS FOR AN ACCOUNTING MACHINE
Filed April 17, 1962   8 Sheets-Sheet 1

FIG. 1

INVENTORS
Lorenz Maier
Fritz Topf
by: Michael S. Striker
Attorney

Oct. 8, 1963 L. MAIER ET AL 3,106,341
CARRIAGE CONTROL APPARATUS FOR AN ACCOUNTING MACHINE
Filed April 17, 1962 8 Sheets-Sheet 3

FIG. 4

INVENTORS
Lorenz Maier
Fritz Topp
by: Michael S. Striker
Attorney

FIG. 6

Oct. 8, 1963  L. MAIER ET AL  3,106,341
CARRIAGE CONTROL APPARATUS FOR AN ACCOUNTING MACHINE
Filed April 17, 1962  8 Sheets-Sheet 7

INVENTORS
Lorenz Maier
Fritz Topf
by:
Michael S. Striker
Attorney

Oct. 8, 1963  L. MAIER ET AL  3,106,341
CARRIAGE CONTROL APPARATUS FOR AN ACCOUNTING MACHINE
Filed April 17, 1962  8 Sheets-Sheet 8

Fig. 11

INVENTOR.
Lorenz Maier
Fritz Topf

BY Michael S. Striker
Attorney

United States Patent Office 3,106,341
Patented Oct. 8, 1963

3,106,341
CARRIAGE CONTROL APPARATUS FOR AN
ACCOUNTING MACHINE
Lorenz Maier and Fritz Topf, both of Villingen, Black
Forest, Germany, assignors to Kienzle Apparate
G.m.b.H., Villingen, Black Forest, Germany
Filed Apr. 17, 1962, Ser. No. 188,162
Claims priority, application Germany Dec. 3, 1956
25 Claims. (Cl. 235—60.46)

The present invention relates to a control device for controlling the functions of an accounting machine, and more particularly to a control device for automatically effecting the computing and other functions of the machine.

The present invention is a continuation-in-part application of the copending application Lorenz Maier et al., Serial No. 700,197, filed December 2, 1957, now abandoned, for a control apparatus for the carriage of an accounting machine.

It is the object of the present invention to provide a control device of this type which is capable of accomplishing different accounting programs while the program change is effected by automatic operations without manual setting.

In accordance with the present invention, the program change in the control device is carried out depending on one or several selected positions of the carriage. By selective operation of certain control means, the carriage is stopped in selected column positions, or passes through such column positions to be stopped in other column positions in accordance with different prgrams. A motor key and a skip key may be used for controlling the change of program in the control apparatus.

One embodiment of the apparatus includes control stop means which are shifted by tabulator stop means between operative and inoperative positions. The tabulator stop means are shifted by tabulator lever means which are mounted on the frame of the machine. After a line has been completed, the control device is returned with the carriage to an initial position, while the tabulator lever means engage the tabulator stop means to return the control stop means to the initial positions of the same. It is advantageous to provide in addition to the automatically operating means, a manually operated member for shifting the tabulator stop means and the control stop means whereby other accounting operations can be carried out.

An apparatus according to the invention comprises supporting means; a paper carriage movably mounted on the supporting means for transporting paper forms having columns; tabulating means for controlling tabulation and skip tabulation of the carriage between a plurality of column positions; operation control means operable to initiate functions of the accounting machine; first actuating means connected to the paper carriage for movement in synchronism with the same and actuating the operation control means in accordance with one or several predetermined programs during movement of the carriage; program changing means for changing the program of the first actuating means; and second actuating means for actuating the program changing means when the carriage is stopped by the tabulating means.

In one embodiment of the invention, the first actuating means include control stop means spaced from each other. At least one shiftable first stop is mounted on the carriage shiftable between a normal position and the shifted position, and the plurality of movable second stops are mounted on the carriage displaceable between inoperative and operative position and are connected by linkage means to the first stops so that the second stops are shifted when the first stop is shifted. The tabulating means have a tabulating position located in the path of the first and second stops for shifting the first stop during carriage movement, and for stopping the carriage when stopped by the first stop, and by a second stop in the operative position of the same. When the tabulator means are shifted between an inoperative position and a tabulating position, the second stops are automatically set to a changed program when the first stop is shifted by the tabulating means. In this embodiment, the stops, which determine the programs of the machine, are all mounted on the paper carriage.

Another embodiment of the present invention employs an actuating contact drum which rotates in synchronism with the movement of the paper carriage, and cooperates with stationary contacts so that electromagnetic operation control means are energized to initiate functions of the accounting machine. The contact drum is shiftable in axial direction between a plurality of positions, and has contacts providing different programs in the axially shifted positions of the contact drum. Program changing means shift the contact drum in axial direction, and preferably include an electromagnetic member, and a switch controlling the electromagnetic member and being shifted whenever the tabulating means are operative in a column position of the carriage. For example, when a tabulator stop is engaged by a tabulating lever on the frame of the machine, the lever is shifted and turns the switch to an active position in which it can be closed by controlled cam means rotating in synchronism with the contact drum, so that the operation control means of the accounting machine are only operated in selected positions of the paper carriage, for example while the operation control means are operated in accordance with a first program.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The control device according to one embodiment of the present invention is intended to be used in connection with an accounting machine as described in detail in the British patent specification 749,504. The computing functions and other functions of a machine of this kind are either manually controlled by a number of control keys arranged on the keyboard of the machine, or automatically controlled by the carriage of the machine. For this purpose the carriage of the machine is provided with a control device, best seen in FIGS. 4, 5 and 6.

Figure 4:
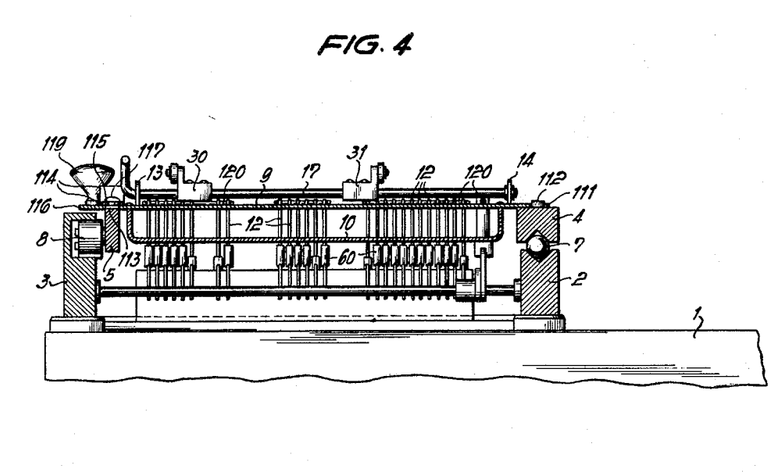
FIG. 4 is a cross sectional view illustrating the control apparatus as mounted in the accounting machine.
Figure 5:
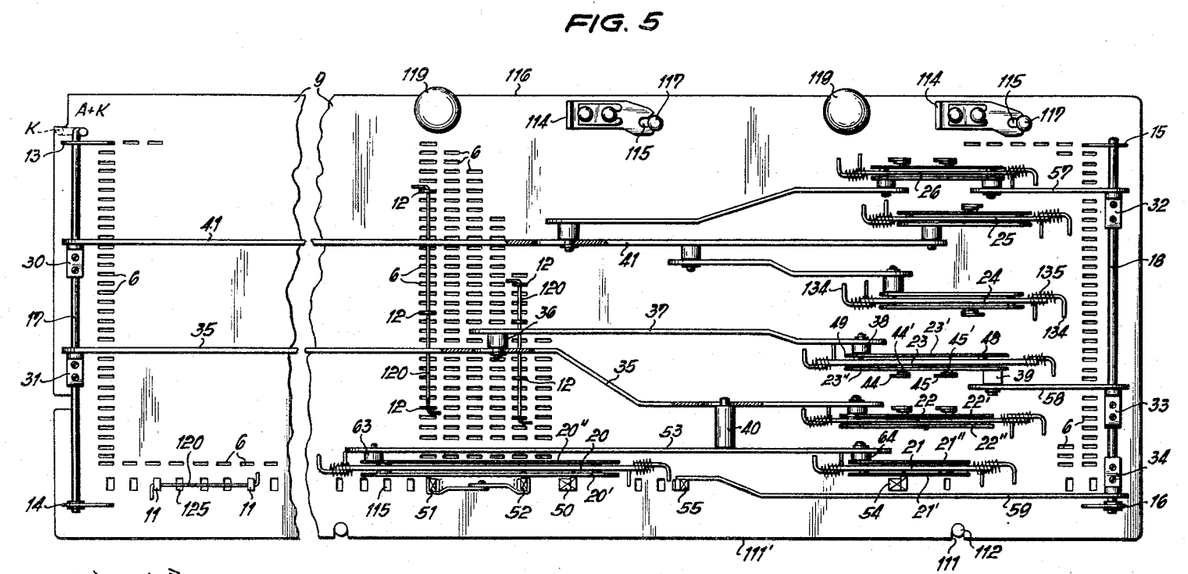
FIG. 5 is a plan view of the control apparatus of the embodiment of FIG. 2.

As shown in FIG. 4, supporting rails 2 and 3 are fixedly mounted in the frame 1 of the machine. The lateral walls of the carriage are fixedly secured to the ends of the rails 4 and 5 which are movably supported on the stationary rails 2 and 3 by rollers 8 and balls 7. The control apparatus includes an upper plate 9 and a lower plate 10 which are fixedly connected to each other. As shown in FIGS. 4 and 5, plates 9 and 10 constitute a carrier member for the parts of the control device and are exchangeable together with their associated parts by operation of slides 114. The upper plate 9 is provided with cut-out portions 111 at its front edge 111' receiving correspondingly shaped bolts 112 on rail 4. On the rear edge 116 suitable holes 113 and slides 114 having longitudinal slots are provided. As best seen in FIG. 5, bolts 117 project into the holes 113 which are fixed to rail 5 and provided with recessed portions receiving the edges of slides 114 along the longitudinal slots 115 when slides 114 are pushed to the right as viewed in FIG. 5, so that the control device is then secured to the rails 4 and 5 of the carriage. Knobs 119 are provided to allow an easy handling of the control device by the operator.

Figure 6:
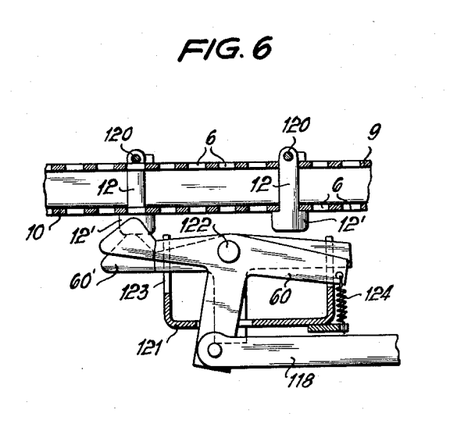
FIG. 6 is a partial cross sectional view of the control device and associated control levers.

Plates 9 and 10 have a plurality of vertically aligned pairs of slots 6, which are arranged in lines and columns, as best seen in FIG. 5. As best seen in FIG. 6, the narrow shanks of control stops 12 are guided in pairs of aligned slots 6 in plates 9 and 10, while the broader lower head portions 12' cooperate with control levers 60 mounted in the machine frame. The upper ends of stops 12 protrude above plate 9 and have holes therein through which a wire 120 is put to secure the control stops 12 to plates 9 and 10. The control levers 60 are pivotally mounted in a housing 121 on a common shaft 122. The housing 121 has lateral slots 123 to guide the control levers 60. Springs 124 hold control levers 60 normally in the position of the foremost lever 60 in FIG. 6. Each lever 60 is connected to other parts of the machine, for instance to a part 118, and serves to release a function of the machine when moved to the position of the second lever 60' in FIG. 6 by a control stop 12 moving with the carriage and arranged in an appropriate position in plates 9 and 10. For instance there will be one lever 60 each for releasing the following functions: Plus, minus, total, subtotal operations of computing devices, non-addition, non-printing, repeated printing, release of carriage return, prevention of carriage return carried out by carriage controlling devices, line spacing by a line spacing device, call register 1, call register 2, etc. These devices are actuated in selected positions of the carriage when a lever 60 is shifted to the position shown in broken lines and shifts the respective part 118 for releasing the respective function of the machine. It is therefore apparent that means 60, 118 control, actuate and operate the above mentioned devices and are operation control means.

Figure 9:
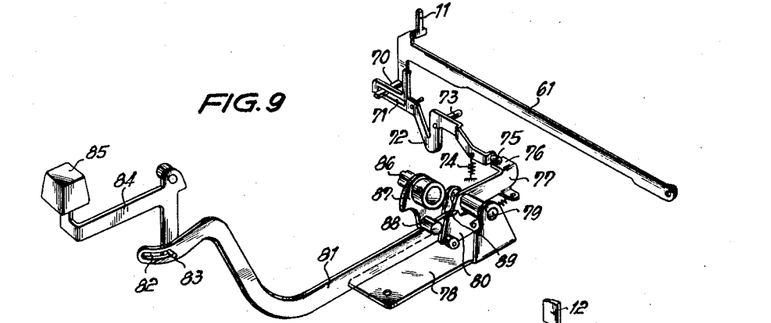
FIG. 9 is a fragmentary perspective view of the tabulating means.

Plates 9 and 10 have a foremost line of differently shaped aligned pairs of slots 125 receiving tabulating stops 11, which control the forward movement of the carriage to stop the same in selected columns. Stops 11 cooperate with a tabulating lever 61 also mounted in the machine frame on a shaft 61a, see FIGS. 2, 3, 4, 9 and 10. The working of this lever 61, which is operated by the depression of the motor key, or of the tabulator key, or of the skip tabulator key, will now be described with reference to FIGS. 9 and 10. When it is intended to let the carriage move under the action of a conventional spring or motor from one column to the next column until the carriage is arrested by the next tabulator stop 11, tabulator lever 61 is retracted to the position shown in broken lines in FIG. 2 for a very short time only and then returned again to its initial position under control of a spring (not shown). This movement of the tabulator lever 61 for a normal tabulating operation is effected either automatically at the end of each working cycle of the machine, such working cycle being released by the operation of the motor key, or, if tabulation is to be effected by manual setting, by a tabulating key. The arrangement for shifting the tabulator lever 61 is shown in FIG. 9. The tabulator lever 61 has a transverse projection 70 which projects into a longitudinal slot 71 of a lever 72 which is pivotally mounted on a bolt 73 in the machine frame. The lever 72 is urged by a spring 74 to turn in clockwise direction, so that the tabulator lever 61 is normally kept in its upper position in which it can engage the tabulating stops 11. At its right end, lever 72 has a bolt 75 which lies on top of a transverse lug 76 of a lever 77 pivotally mounted in a bracket 78 on a pin 79. The left arm of lever 77 is pivotally connected on one side to a pawl 80 and on the other side to a lever 81. The lever 81 has a longitudinal slot 82 at its left hand end into which projects a pin 83 on the key lever 84 of a tabulating key 85 arranged on the keyboard of the machine.

When a manual tabulation of the carriage is to be carried out, key 85 is operated, thereby moving lever 81 towards the right, so that lever 77 is rotated in anticlockwise direction. By this movement of lever 77, lever 72 is also rotated and retracts tabulating lever 61 so that the same releases tabulating stop 11. The carriage can therefore move under the effect of its main spring, or motor until it is arrested by tabulating lever 61 returned to its initial position and engaging another tabulating stop 11.

If the motor key of the machine is depressed, the tabulating movement is automatically carried out after the normal operational cycle of the machine. The electric motor driving the machine is started so that this motor can now effect an oscillating movement of the main shaft 86 of the machine. As shown in FIG. 9, the main shaft 86 of the machine carries a cam 87 having a stud 88 cooperating with a pawl 80 pivotally connected to the lever 77. The oscillating movement of the main shaft 86 at first results in an anticlockwise movement of cam 87 and afterwards in a clockwise movement of this cam. During the anticlockwise movement of cam 87, stud 88 slides over pawl 80 only very shortly and therefore does not operate lever 77. When cam 87 returns to its initial position during its movement in clockwise direction, stud 88 engages the curved surface 89 of pawl 80 and therefore depresses this pawl and pivots lever 77 which retracts tabulating lever 61 to its lower position releasing a tabulating stop 11 so that the carriage can move until it is arrested by the next tabulating stop 11. The time during which the stud 88 cooperates with the curved surface 89 of pawl 80 is just sufficient to move down lever 61 to release a tabulating stop 11. After that, stud 88 moves out of engagement with the curved surface 89, so that spring 74 can return levers 72 and 61 to their initial positions.

If a skip tabulating movement of the carriage is to be carried out, and if one or several of the fixed tabulating stops 11 are to be skipped, the tabulating lever 61 must be first retracted, and then arrested in its retracted position, until it is released again by a control stop 12 arranged in the control device of the machine.

Figure 10:
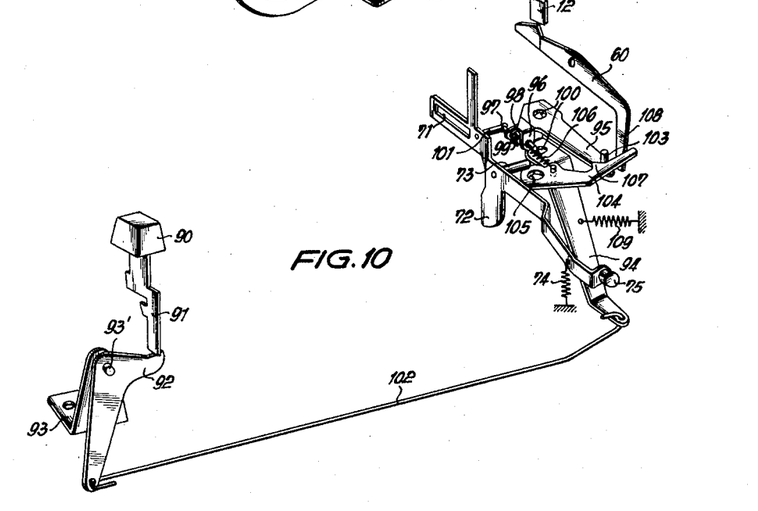
FIG. 10 is a fragmentary perspective view of the additional means for performing a skip tabulation.

To effect this function of the machine the mechanism shown in FIG. 10 is provided. The skip key 90 acts with its shank 91 on a two-armed lever 92 mounted to 93' on a bracket 93. A connecting rod 102 connects lever 92 to one arm 94 of a lever in the form of a stirrup having two arms 94 and 95 and a projecting lug 96 cooperating with a pin 97, slidably mounted in a bracket 98. A spring 99 is mounted on pin 97 and is tensioned when the stirrup 94, 95 is turned in anticlockwise direction about a shaft in bearing bores 100. This movement of the stirrup 94, 95 is effected by the operation of the skip key 90 through parts 90, 91, 92, 102.

In order to arrest stirrup 94, 95 in this position, arm 95 of stirrup 94, 95 has a pin 103, which engages a lever 104 pivotally mounted at 105. Lever 104 is biassed in anticlockwise direction by a spring 106. Lever 104 has a nose 107 which serves to arrest stirrup 94, 95 in two positions. When skip key 90 is depressed, stirrup 94, 95 will be arrested in a position in which pin 103 is on the left of nose 107 on lever 104. The left hand end of the pin 97 cooperates with a pin 101 on lever 72. When lever 72 is in the position shown in FIG. 10 and skip key 90 is operated, the spring 99 will only be tensioned as the pin 97 engages pin 101. When, however, in the course of the working cycle of the machine, lever 72 is turned in anticlockwise direction by the operation of the main shaft 86 of the machine through parts 87, 88, 89, 77, then pin 101 will move down. Since spring 99 is tensioned, it will now move pin 97 to engage pin 101, so that spring 74 can no longer move levers 72 and 61 back to their initial position. The carriage will now move forward until a stop 12 in the control device on the carriage engages the corresponding stop lever 60 to move stop lever 60 in anticlockwise direction, so that its arm 108 moves lever 104 to the right. Therefore stirrup 94, 95 is retracted by its spring 109 to its initial position, in which the pin 103 is on the rght of nose 107. This means, that also pin 97 is retracted and does no longer engage pin 101 on lever 72, so that spring 74 can now move levers 72 and 61 back to their initial position.

The control device as it has been described so far is not an object of the invention, as it has set control stops 12 and tabulating stops 11 and is therefore only suited for controlling the machine in accordance with one accounting program, whereas the invention is directed to a control device having additional program changing means effective in certain predetermined column positions of the carriage. To explain the necessity of such control devices with additional program changing means reference is made to FIG. 1, which shows an example of certain accounting operations in which a change of program must be carried out. The left portion of this figure shows an account statement having columns 1 to 5, and the right portion of the figure shows an account card having columns 6 to 10. These forms are transported by the carriage. Line I incorporates the headings of the columns. Column 1 refers to the account number, column 2 refers to the old balance, column 3 refers to the number of a voucher and to the date from which interests on such transactions as will be debited or credited are paid, this being designated by "value," columns 4a and 4b refer to the transaction and are debit and credit subcolumns, column 5 refers to the new balance and has debit and credit subcolumns. The account card has columns which are associated with certain columns of the account statement. Column 6 refers to the date and number of the voucher, and to the "value," subcolumns 7a and 7b refer to the credit or debit transactions, column 8 refers to the new balance, column 9 refers to a balance brought forward, and column 10 refers to the account number.

Figure 1:
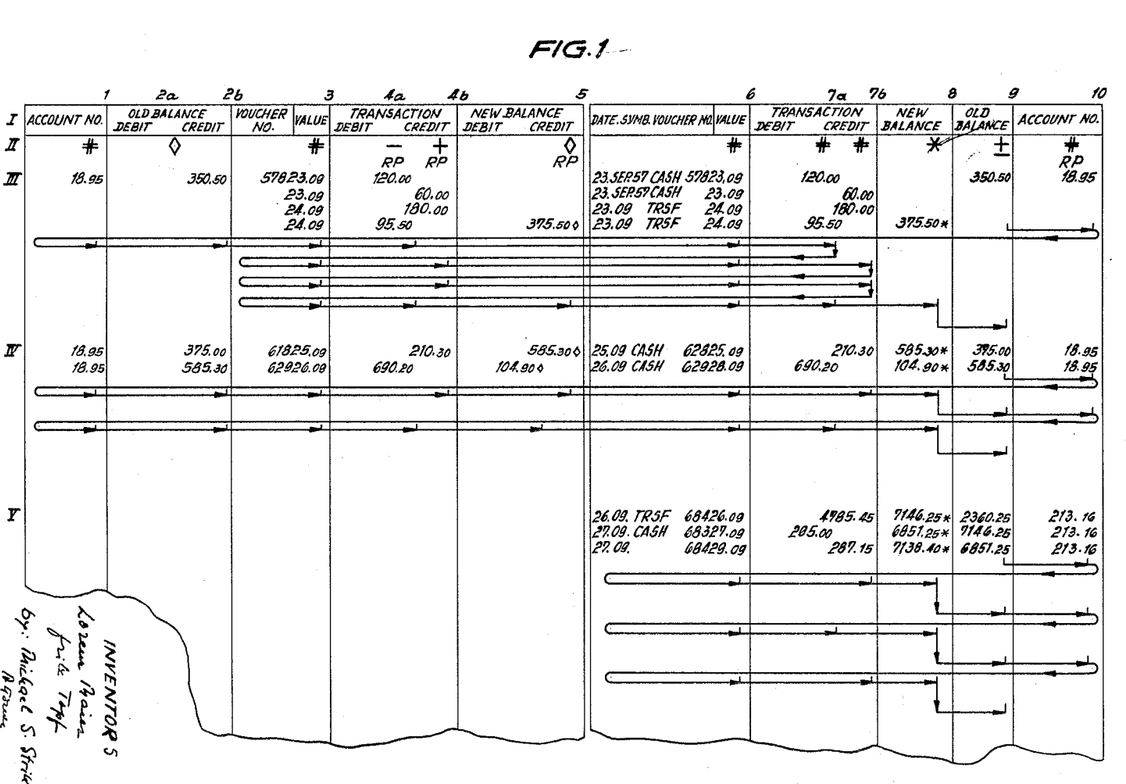
FIG. 1 illustrates two forms which are simultaneously used in the accounting machine, and are simultaneously printed.

Line II contains symbols indicating machine functions in the respective columns, for example nonaddition #, subtotal ◇, plus +, minus —, total *, repetition printing RP and so forth. These functions and others, which are necessary to control the machine in accordance with this program, as for instance also the calling up of certain accumulating registers and so on, are programmed in the control device by setting fixed control stops 12 in certain positions.

The two forms are intended for the following accounting operations:

(1) Printing of the account statement and of the account card with several entries without the printing of an intermediate result, except after the last entry. This operation is shown under III in FIG. 1 by numerical example and by arrows, to be explained later.

(2) Printing of the account statement and of the account card when a single entry is posted. This is shown under IV.

(3) Entering of amounts only on the account card, as may be seen under V.

The numerical examples in FIG. 1 are self-explanatory. The lines and arrows after each numerical example represent the movements of the bookkeeping carriage. An arrow pointing to the right with a short vertical line attached thereto represents a carriage stop, an arrow pointing to the left without a vertical line indicates a return movement of the carriage and a vertical arrow represents a line spacing motion of the platen. When there is no vertical arrow at the end of one line then there is no line spacing, so that the platen carrying the forms and the forms remain in the previous line position. Each new accounting operation is started in column 9 for the old balance and finished by printing the new balance in column 8, a line spacing movement of the platen, and a carriage movement to column 9.

It will be realized that in the first accounting operation 1, shown at III, the transactions have to be entered on the statement as well as on the account card in addition to the account number and to the previous balance which have to be entered at the beginning of each accounting operation. The printing of the voucher number, and of the amount of the transaction is automatically repeated on the account card in the correct subcolumn. The carriage must be stopped in corresponding credit subcolumns of the statement and of the account card if the amount is credited, and in corresponding debit subcolumns of the statement and of the account card, if the amount is a debit amount. The stopping of the carriage in selected columns and subcolumns, is basically controlled by the preset program which is varied by selective actuation of the motor key and of the skip key by the operator. As indicated by lines and arrows at III in FIG. 1, the carriage moves from column 9, "old balance" to column 10 where the account number is entered, and then to column 1, column 2, and column 3 in accordance with the preset program.

The operator must now decide whether the carriage is to stop in the debit subcolumn 4a, or in the credit subcolumn 4b. Operation of the motor key will effect movement of the carriage into the next column 4a where a stop 11 stops the carriage. Operation of the skip key will effect skipping of subcolumn 4a, and stopping of the carriage at the next stop in subcolumn 4b. In the event that the operator stops the carriage in subcolumn 4a, the motor key must not be operated again which would result in stopping of the carriage in subcolumn 4b, but must operate the skip key so that the carriage passes subcolumn 4b and column 5 and stops in column 6 where a printed entry is required, the printing of the transaction, the new balance is to be automatically printed in column 5, and such printing is to be repeated in column 8 of the account card without a carriage return between the two posting operations.

In the accounting operation 3., nothing is to be printed in the statement, and only the account card is to be printed, so that the carriage has to be stopped during the return movement in column 6 of the account card whereupon a credit or a debit amount is posted in the account card, and a new balance is automatically calculated and printed.

Figures 2, 3:
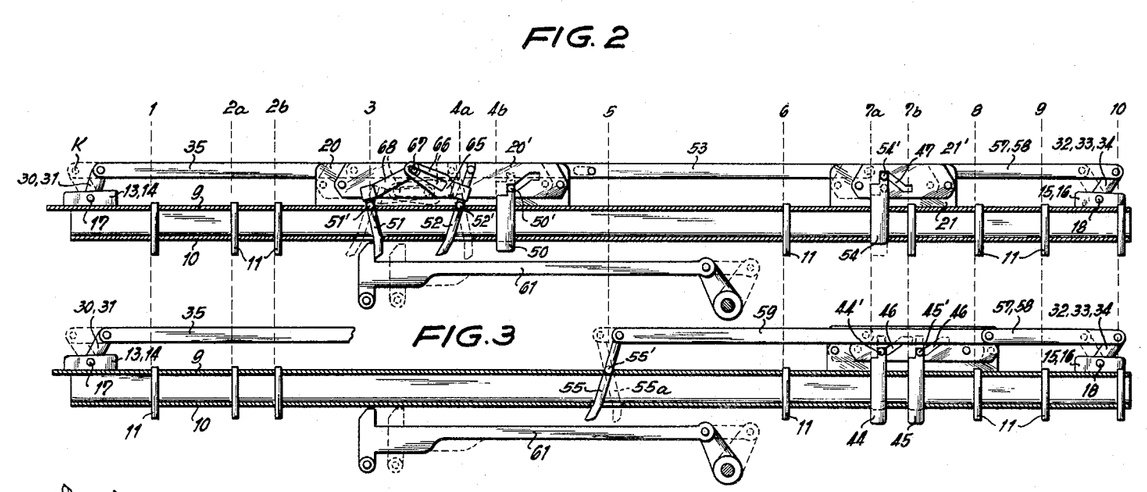
FIG. 2 is a schematic longitudinal sectional view of the control apparatus according to one embodiment of the invention.
FIG. 3 is another schematic longitudinal sectional view of the control apparatus of FIG. 2.

One embodiment of the control apparatus with program changing means which perform the above described operations in accordance with the present invention, is illustrated in detail in FIGS. 2, 3, 5, 7 and 8, of which FIG. 2 shows the control means for the posting of the first three lines under III in FIG. 1, whereas FIG. 3 shows the control means for the posting of the last line under III, and lines 1 and 2 under IV in FIG. 1 as will be explained hereinafter in detail.

Supporting brackets 13, 14, 15 and 16 are mounted on top of plate 9, and turnably support two control shafts 17 and 18, respectively. Arms 30, 31, 32, 33 and 34 are fixedly connected to the control shafts 17 and 18 and turn with the same. Each of the arms 30—34 is pivotally connected to a rod 41, 35, 57, 58, and 59, respectively, which transfer the turning movement of the shafts 17 and 18, as will be described hereinafter.

Figure 7:
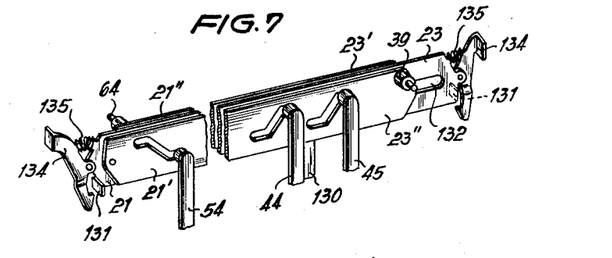
FIG. 7 is a fragmentary perspective view showing the program changing means.
Figure 8:
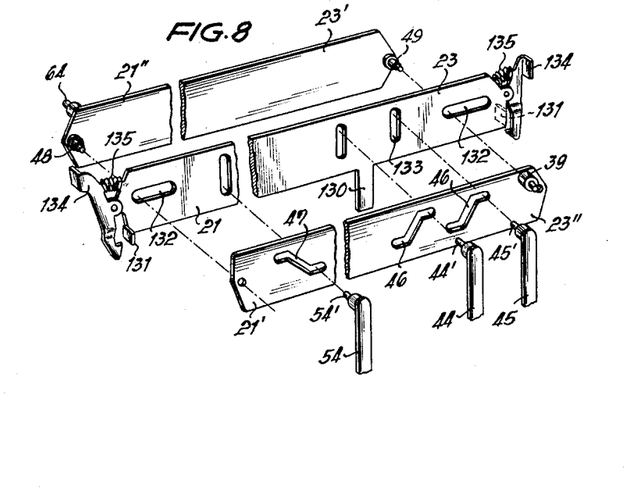
FIG. 8 is a fragmentary exploded view showing the parts forming the program changing means according to FIG. 7.

A set of guide plates 20, 21, 22, 23, 24, 25 and 26 is mounted on plate 9, which are of corresponding shape and construction, and cooperate with corresponding elements. For example, FIGS. 7 and 8 show in their right parts the guide plates 23 and in their left parts the guide plates 21. The set of guide plates 23 for instance consists of a middle plate 23, which has a lower projection 130, bent lugs 131, longitudinal slots 132 at both ends thereof and a number of vertical slots 133; and of two slide members 23′, 23″ of which one or both have curved guide slots 46, 47. Bolts 48 and 49 are provided to connect slide members 23′, 23″, which bolts are guided in the longitudinal slots 132 of middle plate 23, so that slide members 23′ and 23″ may move together along middle plate 23. The middle plate also carries pawls 134 at the ends thereof serving together with the lower projection 130 to secure middle plate 23 in slots 6 of plate 9. Springs 135 urge pawls 134 to engage the edges of a slot 6 in plate 9, while the lugs 131 lie on top thereof. Slide member 23′ is connected by a pin 38 to a rod 37, which is connected by a pin 36 to a rod 35. Rod 35 is pivotally connected to the arm 31. Slide member 23″ is connected by a pin 39 to a rod 58 which is pivotally connected to the arm 33.

The curved slots 46, 47 in slide member 23″ and the vertical slots 133 in middle plate 23 serve to take up pins 44′ and 45′ of stop members 44 and 45, which have the same purpose as the fixed stops 12, with the only difference that they may be moved between an upper ineffective and a lower effective position. It is for this reason that the stops 44 and 45 cooperate with the curved slots 46, 47 and the vertical slots 133 through pins 44′ and 45′. When slide members 23′ and 23″ are moved in relation to middle plate 23, the vertical and curved slots together urge stops 44 and 45 to go up or down. Such movement can be effected by shifting the guide means 23′ and 23″ by operation of any one of the rods 58, 37, or by manual turning of the shaft 17.

The connecting rods 41 and 35 serve for simultaneously shifting all slide means 20′, 20″ to 26′, 26″. The shaft 17 can be manually shifted between the position A+K and the position K as shown in FIG. 5. In the first mentioned position, the control apparatus is set for an accounting operation on the account statement and on the account card, whereas in the position K all slide means 20′, 20″ to 26′, 26″ are shifted to the left. In the latter position, all stops are set in such a manner that printing takes place only on the account card, corresponding to operation 3.

The control shaft 18 is shifted in accordance with the respective column position of the carriage through the rod 59, and effects thereby a simultaneous shifting of the rods 57 and 58 and the slide means 23′, 23″ and 26′, 26″ connected thereto.

As best seen in FIG. 2, a shiftable first tabulating stop 52 is associated with the debit subcolumn 4a instead of one of the normal fast stops 11 and is pivotally mounted at 52′ in plate 9. The end of a shiftable stop 52 is pivotally mounted in the slide member 20′. A second movable tabulator stop 50 has a pin 50′ which is guided in the guide slots of the slide member 20′ and plate 20, corresponding to the construction of plates 23 and 23′ as shown in FIGS. 7 and 8. The connecting rod 53 is connected by pin 63 to the slide member 20″, and through a pin 64 to the slide member 21″. The slide means 21′ and 21″ operate the tabulator stop 54, whose pin 54′ is guided in the guide slots of the slide member 21′ and plate 21. The shiftable first tabulating stop 52 is fixedly connected to a lever 65 which has a slot 66. A presetting lever 51 is pivotally mounted at 51′ in the support 9, and fixedly connected to a lever 68 which has a pin 67 guided in the slot 66 of lever 65.

When an accounting operation 1, is carried out, which requires the posting of several amounts on the statement and on the account card transported by the carriage without printing of an intermediate result, the tabulator control lever 61 engages the lever 51 when the carriage arrives in column 3, and shifts lever 51 into the position shown in solid lines. When the carriage is in the position associated with column 3, the operator actuates either the motor key or the skip key. In the event that a debit amount is to be entered, the operator actuates the motor key so that the tabulator lever 61 engages the shiftable first tabulating stop 52 and shifts the same into the position illustrated in broken lines. Thereby, the slide means 20′, 20″ is shifted to the left, and the second tabulator stop 50 is raised to an inoperative position. At the same time, the connecting rod 53 operates the slide means 21′, 21″. Since the guide slot of the slide 21′, 21″ extends in a direction opposite to the direction of the guide slot of the slide means 20′, 20″, the stop 54 is shifted into its lower operative position. After the debit amount has been entered, the operator presses the skip key, since several entries are to be successively posted without formation of an intermediate total and the carriage is therefore not to be arrested in column 5 for the new balance. Since the stop 50 has been raised due to the shifting of stop lever 52, the carriage is not stopped until it reaches column 6. The motor key is actuated, and the carriage is then automatically stopped in column 7a by the stop 54, and at the same time the carriage return is initiated by the stops 44 and 45 which have been shifted by slide means 23′, 23″ to an operative position, in which they cooperate with the control lever 50 which serves to release the carriage return.

During the return movement of the carriage, the shifted stops 51 and 52 are returned by the control lever 61 to their previous initial positions, in that the sloped surface of this lever engages these stops, shifts them back, and then slides off, being returned again under the effect of spring 74, see FIGS. 9 and 10.

In the event that a credit amount is to be posted, the operator presses the skip key after entering the number of the voucher, and the value. Thereby a posting in column 4b is achieved. The first stop lever 52 is skipped and remains in its normal position, so that the tabulator stops 50 and 54 also remain in the position shown in solid lines in FIG. 2. In this operation, the carriage is stopped by stop 51 in column 3 and then, after operation of the skip key, passes stop 52 and is stopped by stop 50 in the credit column 4b, and again after actuation of the skip key is stopped by a set stop 11 in column 6, and then in subcolumn 7b for repeating printing of the credit amount. The carriage stops in subcolumn 7b since the stop 54 is inoperative in the position of FIG. 6, since stop 52 was not shifted.

Lever 51 assures that stop 52 is in its initial position shown in solid lines before a new accounting operation starts. This is particularly necessary, if an error has been made when posting a debit amount in column 4a, and if such error has to be corrected.

If an accounting operation 2 shown at IV is to be carried out for posting a transaction on the account statement and on the account card, or for posting the total of several entries on the account statement and on the account card, the control device must be set in such a manner that the carriage return is not initiated when the carriage arrives in the columns 7a and 7b of the account card. In this event, other operations must be performed, for example, the automatic printing of the new balance in column 8, line shifting, and so forth. The control devices necessary for this operation are particularly shown in FIG. 3. A shiftable tabulating stop 55 is pivotally mounted at 55' in the column for the new balance and pivotally connected to the linking rod 59 which is connected to the control shaft 18 for turning the same. When the tabulating stop 55 is shifted, control shaft 18 is turned, and shifts the rods 57 and 58, and thereby the stops which are controlled by the slide means 26', 26" and 23', 23". The stops 44 and 45 which are controlled by the slide means 23' and 23" and effect the initiation of the carriage return, are retracted to their inoperative position when the lever 55 is shifted. The operator determines whether such shifting is to be carried out by actuating either the motor key or the skip key after the credit or debit amount has been entered in columns 4a and 4b, respectively. If the motor key is operated, which is done when a printing of the new balance is intended in column 5, the carriage is stopped in column 5 so that the lever 55 is shifted, and the stops 44 and 45 for the carriage return are rendered inoperative. The machine functions now in accordance with the normal program in accordance with the set stops 11.

In the event that an accounting operation as described at 3. is to be carried out, which requires only the printing of the account card, the control shaft 17 is manually turned from the position $A+K$ to the position K whereby all slide means 20', 20" to 26', 26" are shifted to the left as viewed in FIG. 5 so that the program required for this operation is preset.

Figure 11:
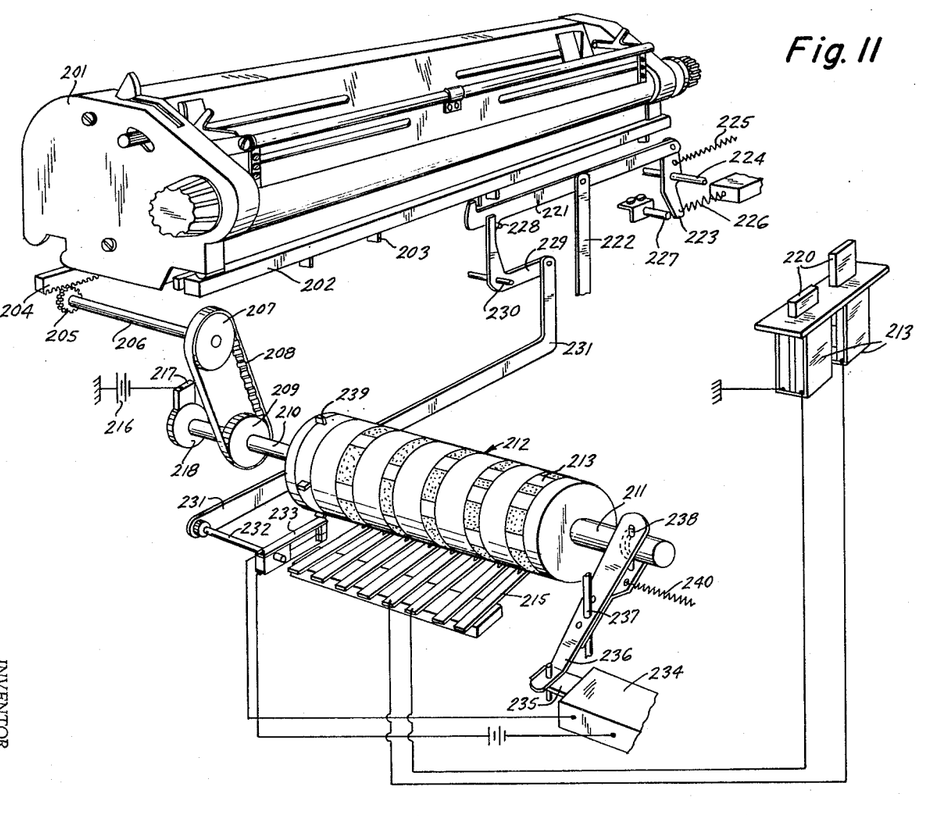
FIG. 11 is a fragmentary perspective view of another embodiment of the invention.

Referring now to the embodiment of FIG. 11, the paper carriage 201 is biased by a spring, not shown to move from the right to the left as viewed in FIG. 11, so that a paper form mounted on the platen passes a printing device. A tabulator plate or bar 202 is secured to the paper carriage and moves with the same. The paper carriage 201 also carries a rack bar 204, with which a pinion, not shown of a drive motor, not shown, meshes so that the carriage can be driven to move from the left end position thereof to the right end position thereof.

The rack bar 204 meshes with another pinion 205 on a shaft 206 which carries a gear pulley 207 connected by a toothed belt 208 to another gear pulley 209 secured to a shaft 210.

Shaft 210 carries a sleeve 211 which is connected to shaft 210 for turning movement, but is slidable on the same in axial direction. A contact drum 212 is secured to sleeve 211 for axial movement with the same, and has a series of circular contact groups 213, the contacts of each group being circumferentially spaced from each other. A set of stationary contacts 215 cooperates with the contact drum, and as is clearly shown in FIG. 11, some of the contacts will slide on selected circular groups of contacts 213 when the contact drum 212 is in the illustrated position, whereas upon shifting of the contact drum in axial direction, other circular groups of contacts 213 will cooperate with selected groups of contacts 215. Contact drum 212, 213 and contacts 215 constitute first actuating means which are connected to the paper carriage for movement in synchronism with the same. One set of circular groups of contacts 213 represents a first program, and the other set of circular groups of contacts 213 represents another program. In each of the two axially shifted program positions of the contact drum 212, the operation control means 219 of the accounting machine will be operated in a different sequence according to the respective program. A battery 216 is connected to a slide contact 217 sliding on a circular contact disc 218 which is electrically connected to all contacts 213.

The tabulator stops 203 are set on the carriage in accordance with column positions of the paper forms, as described with reference to FIGS. 1 and 2. Tabulator stops 203 correspond to tabulator stops 11 of the embodiment of FIGS. 2 and 3, and cooperate with a tabulator lever 221 which corresponds to tabulating lever 61 of the embodiment of FIGS. 2 and 3. Tabulator lever 221 has one end pivotally mounted on another lever 223 which is turnable about shaft 224. A spring 225 is connected to lever 223 and draws lever 221 to the right as viewed in FIG. 11. A damping and braking spring 226 abuts lever 223, whose movement is limited by a stop 227. The other end of lever 221 carries a projecting pin 228 cooperating with a bell crank lever 229 turnable about a shaft 230 and being articulated to a link 231 whose free end is fixed to a shaft 232 to which an actuating switch member 233 is secured. Switch member 233 is located in the region of control cam means 239 on the contact drum 212. When the switch member 233 is engaged by one of the control elements of control cam 239, switch member 233 is placed in an operative condition in which it is closed and closes the circuit of electromagnetic member 234. When the switch member 233 is located between control elements of control means 239, it assumes an open inoperative condition.

Tabulating lever 221 is connected to a link 222 which is operated at the end of each operational cycle of the accounting machine to pull the tabulator lever 221 downward so that it is located outwardly of the path of movement of the tabulator stops 203. Tabulator lever 22 is controlled by devices shown in FIGS. 9 and 10 as described for tabulator lever 61, and can be controlled in such a manner that it moves downward to an inoperative position for a short time only so that it returns into a position located in the path of movement of the tabulator stops 203 early enough to cooperate with the next following tabulator stop 203. However, it is also possible to temporarily hold tabulator lever 221 in the lower inoperative position so that the respective following tabulator stop, or tabulator stops 203 are skipped.

When the tabulator lever 221 is in the illustrated higher operative position, it is engaged by the tabulator stop when the carriage is in a certain column position corresponding to the respective tabulator stop 203, and since tabulator lever 221 is shiftable in longitudinal direction to a working position, the moving carriage effects such shifting, which results in turning of bell crank lever 229, and also in turning of shaft 232 with switch member 233 to an active position in which the switch member is placed in the region of the control elements of control means 239. As long as tabulator lever 221 is retracted by spring 225 and in an inoperative position, which is the case when no tabulator stop 203 engages lever 221, switch member 233 is turned to an inactive position in which the control elements 239 are spaced from switch member 233, and cannot operate the same.

However, when lever 221 is shifted to the left by a tabulator stop, and switch member is placed in its active position, switch member 233 will be closed if a control element 239 is provided in the respective actuating position of contact drum 212, such actuating position corresponding to the column position associated with the respective tabulator stop 203, since the carriage and the contact drum move in synchronism.

When switch 233 is closed, electromagnetic member 234 is energized, and shifts a lever 236 which is mounted on a shaft 237 and is connected by a pin 238 to sleeve 211. Consequently, shifting of lever 236 will effect shifting of the contact drum 212 to a position in which other contacts 213 cooperate with the stationary contacts 215 to control the electromagnetic means 219 in accordance with another program. A spring 240 urges lever 237 and the contact drum 212 to the normal position in which the first program is effective.

The control device illustrated in FIG. 11 operates in the following manner:

If tabulator lever 221 is held retracted from the path of the tabulator stops 203, and skips one or two tabulator stops, the switch member 233 is inactive. Contact drum 212 turns in synchronism with the carriage, so that certain contacts 213 of contact drum 212 engage corresponding contacts 215 whereby the circuit of the electromagnetic means 219 is closed which serve as operation control means to initiate functions of the accounting machine, such as calculating functions, carriage return movement, or line spacing movements.

When tabulating lever 221 is engaged by tabulator stop 203, switch member 233 is placed in its active position cooperating with the control elements 239. In this moment, contact drum 212 is in a turned actuating position corresponding to the column position of the carriage as represented by the respective tabulator stop. If the electromagnetic means 219 are to be energized in accordance with the first normal program, then there is no control element 239 provided which cooperates in the respective turned position of contact drum 212 with switch member 233, and consequently switch member 233 remains open, although it is in its active position. The energization of the function controlling electromagnetic means 219 is consequently determined by the same program, which was effective when a tabulator stop was skipped.

However, if tabulator lever 221 is engaged by a tabulator stop so that switch member 233 is shifted, and if the respective tabulator stop 203 is provided in a column position of the carriage in which the function controlling electromagnetic means 219 are to be energized in accordance with a different program, then a control element is provided in the respective actuating position of the contact drum 212, and effects closing of the switch member 233. The closed switch member 233 energizes electromagnetic member 234 which shifts lever 236 and therefore sleeve 211 with contact drum 212 in axial direction, so that circular groups of contacts 213 corresponding to another program cooperate with the stationary contacts 215, and the function controlling electromagnetic means 219 are energized in accordance with the other program. When tabulator lever 221 is again retracted by link 222 by the devices described with reference to FIGS. 9 and 10, the carriage moves on to the next column position, but at the same time, the released tabulator lever 221 is shifted to the right as viewed in FIG. 11 by spring 225 so that switch member 233 is turned to its inactive position spaced from the control element 239 so that switch member 233 opens whereby electromagnetic member 234 is de-energized. Consequently, spring 240 retracts the contact drum 212, and the contacts 213 are again in a position corresponding to the first program.

From the above description of the embodiment of FIG. 11, it will become apparent that contact drum 212 and contact means 215 constitute first actuating means which are connected to the carriage 201 for synchronous movement, and that the first actuating means 212, 213, 215, actuate the operation control means 219. Program changing means are constituted by lever 236, electromagnetic member 234, and spring 240. Second actuating means are provided for actuating the program changing means through electromagnetic member 234, and include the actuating switch member 233 and the control means 239. The second actuating means are operative when the tabulating means 221, 203 cooperate with each other, and are inoperative when a tabulator stop 203 is skipped by tabulator lever 221.

It will be understood that each of the elements described above, or two or more together, may also find a useful application in other types of accounting machines differing from the types described above.

While the invention has been illustrated and described as embodied in a control apparatus for controlling the functions of an accounting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an accounting machine, in combination, supporting means; a paper carriage movably mounted on said supporting means for transporting paper form means having columns, said paper carriage means being movable between column positions correlated with the columns of the paper form means; tabulating means including a first part mounted on said supporting means and a second part connected to said carriage for controlling tabulation and skip tabulation of said carriage relative to said supporting means between said column positions; operation control means operable to initiate functions of the accounting machine; first actuating means operably connected to said paper carriage for movement in synchronism with the same between a plurality of actuating positions corresponding to said column positions, said first actuating means actuating said operation control means in accordance with a predetermined program during movement of said carriage relative to said supporting means; program changing means for changing the predetermined program of said first actuating means to another program; and second actuating means for actuating said program changing means when said carriage is stopped in predetermined column positions by cooperation of said first and second parts of said tabulating means, said second actuating means remaining inoperative when said predetermined column positions are skipped under the control of said tabulating means.

2. In an accounting machine, in combination, supporting means; a paper carriage movably mounted on said supporting means for transporting paper form means having columns, said paper carriage means being movable between column positions correlated with the columns of the paper form means; tabulating means including a first part mounted on said supporting means and a second part connected to said carriage for controlling tabulation and skip tabulation of said carriage relative to said supporting means between said column positions; operation control means operable to initiate functions of the accounting machine; first actuating means operably connected to said paper carriage for movement in synchronism with the same between a plurality of actuating positions corresponding to said column positions, said first actuating means actuating said operation control means in accordance with a predetermined program during movement of said carriage relative to said supporting means; program changing means for changing the predetermined program of said first actuating means to another program; and second actuating means for actuating said program changing means when said carriage is stopped in predetermined column positions by cooperation of said first and second parts of said tabulating means, said second actuating means including an actuating member having an inoperative condition and an operative condition and being controlled by said first actuating means to assume said operative position when said first actuating means is in selected actuating positions, said program changing means being actuated by said second actuating means only when said actuating member is in said operative condition.

3. In an accounting machine, in combination, supporting means; a paper carriage movably mounted on said supporting means for transporting paper form means having columns, said paper carriage means being movable between column positions correlated with the columns of the paper form means; tabulating means including a first part mounted on said supporting means and a second part connected to said carriage for controlling tabulation and skip tabulation of said carriage relative to said supporting means between said column positions; operation control means operable to initiate functions of the accounting machine; first actuating means operably connected to said paper carriage for movement in synchronism with the same between a plurality of actuating positions corresponding to said column positions, said first actuating means actuating said operation control means in accordance with a predetermined program during movement of said carriage relative to said supporting means; program changing means for changing the predetermined program of said first actuating means to another program; and second actuating means for actuating said program changing means, and including an actuating member having an inactive position and an active position, and an inoperative condition and an operative condition and being operatively connected to said program changing means for operating the same in said operative condition, and a control means connected to said first actuating means for synchronous movement, said control means including a plurality of control elements respectively correlated with selected actuating positions of said first actuating means, said control elements cooperating with said actuating member only in said active position of the same so that said acuating member is placed by said control elements in said operative condition to operate said program changing means, said actuating member being shifted to said active position when said carriage is stopped in predetermined column positions by said tabulating means and remaining in said inactive position when said predetermined column positions are skipped under control of said tabulating means so that said program changing means is not operated.

4. In an accounting machine, in combination, supporting means; a paper carriage movably mounted on said supporting means for transporting paper form means having columns, said paper carriage means being movable between column positions correlated with the columns of the paper form means; tabulating means including a first part mounted on said supporting means and a second part connected to said carriage for controlling tabulation and skip tabulation of said carriage relative to said supporting means between said column positions; operation control means operable to initiate functions of the accounting machine; first actuating means operably connected to said paper carriage for movement in synchronism with the same between a plurality of actuating positions corresponding to said column positions, said first actuating means having a plurality of program positions for actuating said operation control means in accordance with different programs during movement of said carriage relative to said supporting means; program changing means for shifting said first actuating means between said program positions; and second actuating means for actuating said program changing means when said carriage is stopped in predetermined column positions by cooperation of said first and second parts of said tabulating means, said second actuating means remaining inoperative when said predetermined column positions are skipped under the control of said tabulating means.

5. In an accounting machine, in combination, supporting means; a paper carriage movably mounted on said supporting means for transporting paper form means having columns, said paper carriage means being movable between column positions correlated with the columns of the paper form means; tabulating means including a first part mounted on said supporting means and a second part connected to said carriage for controlling tabulation and skip tabulation of said carriage relative to said supporting means between said column positions; operation control means operable to initiate functions of the accounting machine; first actuating means operably connected to said paper carriage for movement in synchronism with the same between a plurality of actuating positions corresponding to said column positions, said first actuating means having a plurality of program positions for actuating said operation control means in accordance with different programs during movement of said carriage relative to said supporting means; program changing means for shifting said first actuating means between said program positions; and second actuating means for actuating said program changing means, and including an actuating member having an inactive position and an active position, and an inoperative condition and an operative condition and being operatively connected to said program changing means for operating the same in said operative condition, and a control means connected to said first actuating means for synchronous movement, said control means including a plurality of control elements respectively correlated with selected actuating positions of said first actuating means, said control elements cooperating with said actuating member only in said active position of the same when said first actuating means is in a selected one of said program positions so that said actuating member is placed by said control elements in said operative condition to operate said program changing means, said actuating member being shifted to said active position when said carriage is stopped in predetermined column positions by said tabulating means and remaining in said inactive position when said predetermined column positions are skipped under control of said tabulating means so that said program changing means is not operated.

6. In an accounting machine, in combination, supporting means; a paper carriage movably mounted on said supporting means for transporting paper form means having columns, said paper carriage means being movable between column positions correlated with the columns of the paper form means; tabulating means including a first part mounted on said supporting means and a second part connected to said carriage for controlling tabulation and skip tabulation of said carriage relative to said supporting means between said column positions; operation control means operable to initiate functions of the accounting machine, and including electromagnetic means; first actuating means operably connected to said paper carriage for movement in synchronism with the same, and including a contact drum means turnable between a plurality of actuating positions corresponding to said column positions, and shiftable in axial direction between a plurality of program positions, and contact means cooperating with said contact drum and being electrically connected with said electromagnetic means for actuating the same during movement of said carriage relative to said supporting means; program changing means for shifting said contact drum means between said program positions and including an electromagnetic member; second actuating means for actuating said program changing means and including an actuating switch member connected into the circuit of said electromagnetic member and having an inactive position and an active position, and an open condition and a closed condition so that said program changing means is operated by said electromagnetic member when said switch member is in said closed position, and a control cam means connected to said contact drum means for synchronous turning movement, said control cam means including a plurality of control elements respectively correlated with selected actuating positions of said first actuating means, said control elements cooperating with said actuating switch member only in said active position of the same when said contact drum means is in a selected one of said program positions so that said actuating switch member is placed by said control elements in said closed condition to operate said program changing means, said actuating switch member being shifted to said active position when said carriage is stopped in predetermined column positions by said tabulating means and remaining in said inactive position when said predetermined column positions are skipped under control of said tabulating means so that said program changing means is not operated.

7. An accounting machine as set forth in claim 6 wherein said first part of said tabulating means includes a tabulating lever turnable to and from a tabulating position and longitudinally shiftable to and from a working position, and wherein said second part includes tabulator stops cooperating with said tabulating lever in said tabulating position of the same to shift the same to said working position; said tabulating lever being operatively connected to said actuating switch member to shift the same to said active position when said tabulating lever moves to said working position upon engagement with a tabulator stop.

8. In an accounting machine, in combination, a frame, a paper carriage movably mounted on said frame for transporting at least one paper form having columns; tabulating means having a first part mounted on said frame and a second part on said carriage for controlling tabulation and skip tabulation of said carriage relative to said frame in accordance with said columns; operation control means operable to initiate computing and other functions of the accounting machine; first actuating means on said paper carriage for actuating said operation control means in accordance with a predetermined program during the movement of said carriage relative to said frame between positions correlated with columns of the paper form; program changing means for changing the predetermined program of said first actuating means to another program also correlated with several columns; and second actuating means for automatically actuating said program changing means when said carriage is stopped in predetermined columnar positions by cooperation of the first and second parts of said tabulating means, said second actuating means remaining inoperative when said predetermined columnar positions are skipped under control of said tabulating means.

9. In an accounting machine, in combination, a frame, a paper carriage movably mounted on said frame for transporting at least one paper form having columns; tabulating means having a first part mounted on said frame and a second part on said carriage for controlling tabulation and skip tabulation of said carriage relative to said frame in accordance with said columns; operation control means mounted on said frame and operable to initiate computing and other functions of the accounting machine; first actuating means on said paper carriage for actuating said operation control means in accordance with a predetermined program during the movement of said carriage relative to said frame between positions correlated with columns of the paper form; program changing means for changing the predetermined program of said first actuating means to another program also correlated with several columns; and second actuating means for automatically actuating said program changing means when said carriage is stopped in predetermined columnar position by engagement of the first and second parts of said tabulating means, said second actuating means remaining inoperative when said predetermined columnar positions are skipped under control of said tabulating means.

10. In an accounting machine, in combination, a frame, a paper carriage movably mounted on said frame for transporting at least one paper form having columns; tabulating means having a first part mounted on said frame and second parts mounted on said carriage for controlling tabulation and skip tabulation of said carriage relative to said frame in accordance with said columns, said first part of said tabulating means comprising first key means for controlling the movement of said carriage to stop in the respective next succeeding column, second key means controlling said first part for skipping at least the respective next succeeding column and a member controlled by said key means and cooperating with said second parts; operation control means mounted on said frame and operable to initiate computing and other functions of the accounting machine, first actuating means on said paper carriage for actuating said operation control means in accordance with a predetermined program during the movement of said carriage relative to said frame between positions correlated with columns of the paper form; program changing means for changing the predetermined program of said first actuating means to another program also correlated with several columns; and second actuating means for automatically actuating said program changing means when said carriage is stopped in predetermined columnar positions by engagement of said member with said second parts said tabulating means, said second actuating means remaining inoperative when said predetermined columnar positions are skipped under control of said skip key of said tabulating means.

11. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same; a plurality of fixed tabulator stops mounted on said paper carriage spaced in accordance with a predetermined program; at least one shiftable first stop mounted on said carriage shiftable between a normal position and a shifted position; a plurality of movable second stops mounted on said carriage displaceable between an inoperative position and an operative position; linkage means connecting said first stop with said second stops so that the latter are shifted between said positions thereof when said first stop is shifted; tabulator means mounted on said frame movable between an inoperative position and a tabulating position located in the path of said first, second, and tabulator stops for shifting said first stop during carriage movement and for stopping said carriage when stopped by said first and tabulating stops, and by a second stop in the operative position of the same; and operating means for shifting said tabulator means between said inoperative and tabulating positions whereby said second stops are automatically set to a changed program when said tabulator means in said tabulating position shifts said first stop to said shifted position.

12. An accounting machine as set forth in claim 11 wherein said first stop is mounted for pivotal movement on said paper carriage shiftable in direction of the carriage movement between said normal position and said shifted position; and wherein said tabulator means engages said shiftable first stop also during return movement of said carriage to shift said shiftable first stop to said normal position whereby said second stops are shifted.

13. An apparatus as set forth in claim 11 wherein said linkage means includes slide means having guiding cam slots inclined to direction of movement of said second stops; and wherein said second stops include pins guided in said slots so that shifting of said linkage means by said first stop effects movement of the second stops between said inoperative and operative positions thereof.

14. An apparatus as set forth in claim 13 and including manually operated means connected to said linkage means for shifting the same and thereby said first stop and said second stops to change the program according to which said paper carriage is stopped in column positions whereby said operation control means are actuated by said control stop means in other column positions of said carriage.

15. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means space from each other so as to be correlated with different carriage positions and engaging during movement of said carriage said operation control means to operate the same; a plurality of fixed tabulator stops mounted on said paper carriage spaced in accordance with a predetermined program; two shiftable first stops mounted on said paper carriage, each first stop having a normal position, and a shifted position correlated with a column position of said paper carriage, said first stops being connected to each other so that each first stop is in said normal position when the other first stop is in said shifted position; a plurality of movable second stops mounted on said carriage displaceable between an inoperative position and an operative position; linkage means connecting said first stops with said second stops so that the latter are shifted between said positions thereof when said first stops are shifted; tabulator means mounted on said frame movable between an inoperative position and a tabulating position located in the path of said first, second, and tabulator stops for shifting said first stops during carriage movement by engaging one of said first stops and for stopping said carriage when stopped by said first and tabulating stops, and by a second stop in the operative position of the same; and operating means for shifting said tabulator means between said inoperative and tabulating positions whereby said second stops are automatically set to a changed program when said tabulator means in said tabulating position shifts said first stops to said shifted position.

16. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same, said control stop means including movable control stop members mounted on said carriage for movement between an inoperative position and an operative position and being associated with different column positions; a plurality of fixed tabulator stops mounted on said paper carriage spaced in accordance with a predetermined program; at least one shiftable first stop mounted on said carriage shiftable between a normal position and a shifted position; a plurality of movable second stops mounted on said carriage displaceable between an inoperative position and an operative position; linkage means connecting said first stop with said second stops so that the latter are shifted between said positions thereof when said first stop is shifted; a third shiftable stop mounted on said carriage shiftable between a normal position and a shifted position; other linkage means connecting said third stop with said movable control stop members so that the latter are shifted between said positions thereof when said third stop is shifted; tabulator means mounted on said frame movable between an inoperative position and a tabulating position located in the path of said first, second, third and tabulator stops for shifting said first and third stops during carriage movement and for stopping said carriage when stopped by said first, third and tabulating stops, and by a second stop or by a movable control stop member in the operative position of the same; and operating means for shifting said tabulator means between said inoperative and tabulating positions whereby said second stops and movable control stop members are automatically set to a changed program when said tabulator means in said tabulating position shifts said first stop to said shifted position.

17. An apparatus as set forth in claim 16 wherein said movable control stops are respectively associated with said operation control means for initiating a return movement of said carriage from different column positions.

18. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same; a plurality of fixed tabulator stops mounted on said paper carriage spaced in accordance with a predetermined program; at least one shiftable first stop mounted on said carriage shiftable between a normal position and a shifted position; a plurality of movable second stops mounted on said carriage displaceable between an inoperative position and an operative position; linkage means connecting said first stop with said second stops so that the latter are shifted between said positions thereof when said first stop is shifted; tabulator means mounted on said frame movable between an inoperative position and a tabulating position located in the path of said first, second, and tabulator stops for shifting said first stop during carriage movement and for stopping said carriage when stopped by said first and tabulating stops, and by a second stop in the operative position of the same; and operating means for shifting said tabulator means between said inoperative and tabulating positions whereby said second stops are automatically set to a changed program when said tabulator means in said tabulating position shifts said first stop to said shifted position, said operating means including a motor key for shifting said tabulator means shortly to said inoperative position and back to said tabulating position so that said paper carriage is stopped in the respective next following position thereof by one of said stops, and a skip key for holding said tabulator means in said inoperative position so that said tabulator means skips a stop at least in the next following position of the carriage whereby said carriage moves through the next following column position.

19. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same; said control stop means including movable control stop members mounted on said carriage for movement between an inoperative position and an operative position and being associated with different column positions; a plurality of fixed tabulator stop mounted on said paper carriage spaced in accordance with a predetermined program; two shiftable first stops mounted on said paper carriage, each first stop having a normal position, and a shifted position correlated with a column position of said paper carriage, said first stops being connected to each other so that each first stop is in said normal position when the other first stop is in said shifted position; a plurality of movable second stops mounted on said carriage displaceable between an inoperative position and an operative position; linkage means connecting said first stops with said second stops so that the latter are shifted between said positions thereof when said first stops are shifted; a third shiftable stop mounted on said carriage shiftable between a normal position and a shifted position; other linkage means connecting said third stop with said movable control stop members so that the latter are shifted between said positions, thereof when said third stop is shifted; tabulator means mounted on said frame movable between an inoperative position and a tabulating position located in the path of said first, second, third and tabulator stops for shifting said first and third stops during carriage movement by engaging one of said first and third stops and for stopping said carriage when stopped by said first, third and tabulating stops, and by a second stop or by a movable control stop member in the operative position of the same; and operating means for shifting said tabulator means between said inoperative and tabulating positions whereby said second stops and said movable control stop members are automatically set to a changed program when said tabulator means in said tabulating position shifts said first stops to said shifted position.

20. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same; a plurality of fixed tabulator stops mounted on said paper carriage spaced in accordance with a predetermined program; two shiftable first stops mounted on said paper carriage, each first stop having a normal position, and a shifted position correlated with a column position of said paper carriage, said first stops being connected to each other so that each first stop is in said normal position when the other first stop is in said shifted position; a plurality of movable second stops mounted on said carriage displaceable between an inoperative position and an operative position; linkage means connecting said first stops with said second stops so that the latter are shifted between said positions thereof when said first stops are shifted; tabulator means mounted on said frame movable between an inoperative position and a tabulating position located in the path of said first, second, and tabulator stops for shifting said first stops during carriage movement and for stopping said carriage when stopped by said first and tabulating stops, and by a second stop in the operative position of the same; and operating means for shifting said tabulator means between said inoperative and tabulating positions whereby said second stops are automatically set to a changed program when said tabulator means in said tabulating position shifts said first stops to said shifted position, said operating means including a motor key for shifting said tabulator means shortly to said inoperative position and back to said tabulating position so that said paper carriage is stopped in the respective next following position thereof by one of said stops, and a skip key for holding said tabulator means in said inoperative position so that said tabulator means skips a stop at least in the next following position of the carriage whereby said carriage moves through the next following column position.

21. In an accounting machine, in combination, a frame; a paper carriage mounted on said frame for movement between a plurality of positions correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same; said control stop means including movable control stop members mounted on said carriage for movement between an inoperative position and an operative position and being associated with different column positions; a plurality of fixed tabulator stops mounted on said paper carriage spaced in accordance with a predetermined program; at least one shiftable first stop mounted on said carriage shiftable between a normal position and a shifted position; a plurality of movable second stops mounted on said carriage displaceable between an inoperative position and an operative position; linkage means connecting said first stop with said second stops so that the latter are shifted between said positions thereof when said first stop is shifted; a third shiftable stop mounted on said carriage shiftable between a normal position and a shifted position; other linkage means connecting said third stop with said movable control stop members so that the latter are shifted between said positions thereof when said third stop is shifted; tabulator means mounted on said frame movable between an inoperative position and a tabulating position located in the path of said first, second, third and tabulator stops for shifting said first and third stops during carriage movement and for stopping said carriage when stopped by said first, third and tabulating stops, and by a second stop or by a movable control stop member in the operative position of the same; and operating means for shifting said tabulator means between said inoperative and tabulating positions whereby said second stops and said movable control stop members are automatically set to a changed program when said tabulator means in said tabulating position shifts said first stop to said shifted position, said operating means including a motor key for shifting said tabulator means shortly to said inoperative position and back to said tabulating position so that said paper carriage is stopped in the respective next following position thereof by one of said stops, and a skip key for holding said tabulator means in said inoperative position so that said tabulator means skips a stop at least in the next following position of the carriage whereby said carriage moves through the next following column position.

22. In an accounting machine, in combination, a frame; a paper carriage mounted on said frame for movement between a plurality of position correlated with the columns of a paper form transported by said paper carriage; operation control means mounted on said frame and operable to initiate computing and other functions of the accounting machine; actuating means on said paper carriage including control stop means spaced from each other so as to be correlated with different carriage positions and engaging during movement of said carriage said operation control means to operate the same, said control stop means including movable control stop members mounted on said carriage for movement between an inoperative position and an operative position and being associated with different column positions; a plurality of fixed tabulator stops mounted on said paper carriage spaced in accordance with a predetermined program; two shiftable first stops mounted on said paper carriage, each first stop having a normal position, and a shifted position correlated with a column position of said paper carriage, said first stops being connected to each other so that each first stop is in said normal position when the other first stop is in said shifted position; a plurality of movable second stops mounted on said carriage displaceable between an inoperative position and an operative position; linkage means connecting said first stops with said second stops so that the latter are shifted between said positions thereof when said first stops are shifted; a third shiftable stop mounted on said carriage shiftable between a normal position and a shifted position; other linkage means connecting said third stop with said movable control stop members so that the latter are shifted between said positions thereof when said third stop is shifted; tabulator means mounted on said frame movable between an inoperative position and a tabulating position located in the path of said first, second, third and tabulator stops for shifting said first and third stops during carriage movement by engaging one of said first stops and said third stop, respectively, and for stopping said carriage when stopped by said first, third and tabulating stops, and by a second stop or by a movable control stop member in the operative position of the same; and operating means for shifting said tabulator means between said inoperative and tabulating positions whereby said second stops and movable control stop members are automatically set to a changed program when said tabulator means in said tabulating position shifts said first and third stops to said shifted positions, said operating means including a motor key for shifting said tabulator means shortly to said inoperative position and back to said tabulating position so that said paper carriage is stopped in the respective next following position thereof by one of said stops, and a skip key for holding said tabulator means in said inoperative position so that said tabulator means skips a stop at least in the next following position of the carriage whereby said carriage moves through the next following column position.

23. An apparatus as set forth in claim 22 wherein said linkage means include slide means having guiding cam slots inclined to direction of movement of said second stops; and wherein said second stops include pins guided in said slots so that shifting of said linkage means by said first stop, and by said third stops, respectively, effects movement of the second stops and of said control stop members between said inoperative and operative positions thereof.

24. An accounting machine as set forth in claim 22 wherein said first stops and said third stop are mounted for pivotal movement on said paper carriage shiftable in direction of the carriage movement between said normal position and said shifted position.

25. An apparatus as set forth in claim 22 and including manually operated means connected to said linkage means for shifting the same and thereby said first and second stops and said control stop members to change the program according to which said paper carriage is stopped in column positions whereby said operation control means are actuated by said control stop means in other column positions of said carriage.

References Cited in the file of this patent

UNITED STATES PATENTS

| | | |
|---|---|---|
| 2,285,640 | Anderson | June 9, 1942 |
| 2,650,758 | Von Hacht | Sept. 1, 1953 |
| 2,849,179 | Capellaro | Aug. 26, 1958 |